United States Patent [19]

Takeshima

[11] 4,267,897

[45] May 19, 1981

[54] ELECTRO-MECHANICAL CONVERTERS AND CONTROL APPARATUS FOR POWER STEERING UNITS UTILIZING THE SAME

[75] Inventor: Sadao Takeshima, Higashimatsuyama, Japan

[73] Assignee: Jidosha Kiki Co. Ltd., Tokyo, Japan

[21] Appl. No.: 13,717

[22] Filed: Feb. 21, 1979

[30] Foreign Application Priority Data

Feb. 20, 1978 [JP] Japan .......................... 53/19639[U]
Feb. 20, 1978 [JP] Japan .......................... 53/19640[U]

[51] Int. Cl.[3] .............................................. B62D 5/08

[52] U.S. Cl. .................................. 180/143; 308/6 B; 335/262

[58] Field of Search ...................... 180/141, 142, 143; 335/262; 308/6 A, 6 B

[56] References Cited

U.S. PATENT DOCUMENTS 1,293,052 2/1919 Dinsmoor .......................... 335/262
2,371,330 3/1945 Irstad ................................ 308/6 B
3,851,285 11/1974 Rothfuss .......................... 335/262

FOREIGN PATENT DOCUMENTS 49-108732 of 1974 Japan .

*Primary Examiner*—John P. Silverstrim
*Attorney, Agent, or Firm*—Townsend and Townsend

[57] ABSTRACT

In an electro-mechanical converter of the type wherein a plunger contained in a cylinder is moved in the axial direction thereof by passing a control signal through a solenoid coil wound about the cylinder, the diameter of the plunger is made sufficiently smaller than the inner diameter of the cylinder such that the plunger can move without causing undue friction. The plunger is supported by ball bearings to be movable with respect to the cylinder. To control a power steering unit of a motor car a control valve is actuated by the plunger for controlling the amount or pressure of the operating oil supplied to the power steering unit, in which case the control signal is made to be proportional to the speed of the motor car.

5 Claims, 6 Drawing Figures

ELECTRO-MECHANICAL CONVERTERS AND CONTROL APPARATUS FOR POWER STEERING UNITS UTILIZING THE SAME

BACKGROUND OF THE INVENTION

This invention relates to an electro-mechanical converter utilizing a solenoid coil, and more particularly an electro-mechanical converter wherein a plunger contained in a cylinder is moved in the axial direction in accordance with the magnitude of a control signal supplied to the solenoid coil wound about the cylinder and especially suitable for use as a flow quantity control device of a power steering unit of a motor car, for example.

Since a power steering unit permits easy and rapid steering of a heavy car with an extremely small power as well as a stable running due to its servoeffect and cushioning effect even when the steering wheels of the car receive lateral shock from the load surface, power steering units having various constructions have been developed. According to one example of the prior art constructions, a servovalve utilizing a solenoid coil is connected in a passage of an operating fluid utilized for the power steering unit so as to control the flow of the operating fluid in accordance with the running speed of the motor car. This construction increases the steering power at the high speed running over that of the low speed running thus giving to the driver a steering feeling commensurate with the running speed.

One example of a prior art servovalve utilizing a solenoid coil is disclosed in Japanese laid open patent specification No. 108732/74 wherein a plunger with one end connected to a needle of a needle control valve is contained in a cylinder and an electric coil is wound about the cylinder. A current corresponding to the running speed of a motor car is supplied to the coil to move the plunger in the axial direction for controlling the flow of the operating fluid supplied to the power steering unit through the needle control valve.

In such a servovalve, the plunger is generally made of magnetic material and its external diameter is designed close to the inner diameter of the cylinder so as to closely couple the plunger with magnetic flux generated by the solenoid coil. Further, a portion of the cylinder is also made of magnetic material and designed to bring its end as close as possible to the end of the plunger. Consequently, the plunger is caused to slide along the inner wall of the cylinder by the magnetic flux created by the solenoid coil in response to the control signal. For this reason, a frictional resistance is created between the plunger and the cylinder whereby when the plunger is reciprocated by the solenoid coil and by a return spring, a hysteresis occurs as shown in FIG. 1 of the accompanying drawing in which the ordinate represents the displacement of the plunger and the abscissa represents a control current supplied to the solenoid coil. With the prior art electro-mechanical converter, as shown by curve a, as the control signal is increased gradually, the plunger moves greatly from point $P_1$ to point $P_2$ at a current value $i_1$ and then the plunger moves gradually to point $P_3$ as the current is increased to $i_2$. Thereafter, the plunger does not move beyond point $P_3$ even when the current is increased. Conversely, when the current is decreased, the plunger does not move between current values $i_1$ and $i_2$ but moves greatly from point $P_3$ to Point $P_4$ at a current $i_3$ smaller than $i_1$ as shown by curve b. Thereafter, the plunger moves gradually to the initial point $P_1$ as the current is decreased to $i_4$. Accordingly, when an electro-mechanical converter having such displacement-control signal characteristic is used, it is difficult to provide linear control due to the frictional resistance between the cylinder and the plunger. Moreover, the amount of displacement of the plunger is small. These defects limit the field of application of the electro-mechanical converter, so that its use has been limited to only on-off control.

When an electro-mechanical converter having such a hysteresis characteristic is used in a power steering unit for the control of the flow, the handle becomes rapidly light or heavy at points where the flow quantity changes. Moreover, as such points vary depending upon the direction of rotating the steering handle the steering sense of the driver would be impaired.

FIG. 2 shows a flow quantity-running speed characteristic of a control valve utilized in the power steering unit in which the abscissa represents running speed of a motor car, while the ordinate represents the flow quantity of the operating fluid supplied to the power steering unit through a needle valve. As shown by curve a, with a conventional servovalve, as the running speed of the motor car increases the flow greatly decreases from $F_1$ to $F_2$ at speed $V_1$, then gradually decreases to $F_3$ until speed $V_2$ is reached. Thereafter, the flow is maintained at $F_3$ even when the speed increases. Conversely, when the speed is decreased from high to low, as shown by curve b the flow does not vary at speeds $V_1$ and $V_2$, but greatly increases at $V_3$ and then gradually increases to the initial value $F_1$ until speed $V_4$ is reached. Accordingly, with a power steering unit having such characteristic the flow varies greatly at speeds $V_1$ and $V_3$ with the result that the steering handle of the car becomes abruptly light or heavy at points where the flow changes greatly. Moreover, as such flow quantity varying points differ depending upon the direction of rotating the steering wheel, the steering sense of the driver is impaired.

Such rapid change in the steering load was also experienced in a power steering unit in which the fluid pressure is controlled by the electro-mechanical converter described above.

SUMMARY OF THE INVENTION

Accordingly, a principal object of this invention is to provide an improved electro-mechanical converter which utilizes a solenoid coil and can eliminate the hysteresis characteristic described above.

Another object of this invention is to provide an improved electro-mechanical converter utilizing a solenoid coil and can linearly vary the mechanical displacement over a wide range in response to a control signal.

Still another object of this invention is to provide a flow control device for use in a power steering unit, which uses the electro-mechanical converter described above and can smoothly vary the flow-speed characteristic so as not impair the steering sense of the driver.

A further object of this invention is to provide an improved flow control device suitable for use in a power steering unit and can eliminate the hysteresis characteristic described above of a servovalve utilizing a solenoid coil.

According to one aspect of this invention there is provided an electro-mechanical converter of the type wherein a plunger contained in a cylinder is moved in the axial direction thereof by passing a control signal through a solenoid coil wound about the cylinder, characterized in that the outer diameter of the plunger is determined such that it can move freely within the cylinder without causing undue sliding friction therebetween and that the plunger is supported by balls to be movable with respect to the cylinder.

According to another aspect of this invention, there is provided control apparatus for a power steering unit of a motor car of the type wherein a plunger contained in a cylinder is moved in the axial direction thereof in accordance with the magnitude of a speed signal of the motor car, the speed signal being passed through a solenoid coil wound about the cylinder, and the amount or pressure of operating fluid supplied to the power steering unit is controlled by a control valve operated by the plunger, characterized in that the outer diameter of the plunger is determined such that it is movable freely within the cylinder without causing undue sliding friction therebetween, and that the plunger is supported by balls to be movable with respect to the cylinder.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 3:
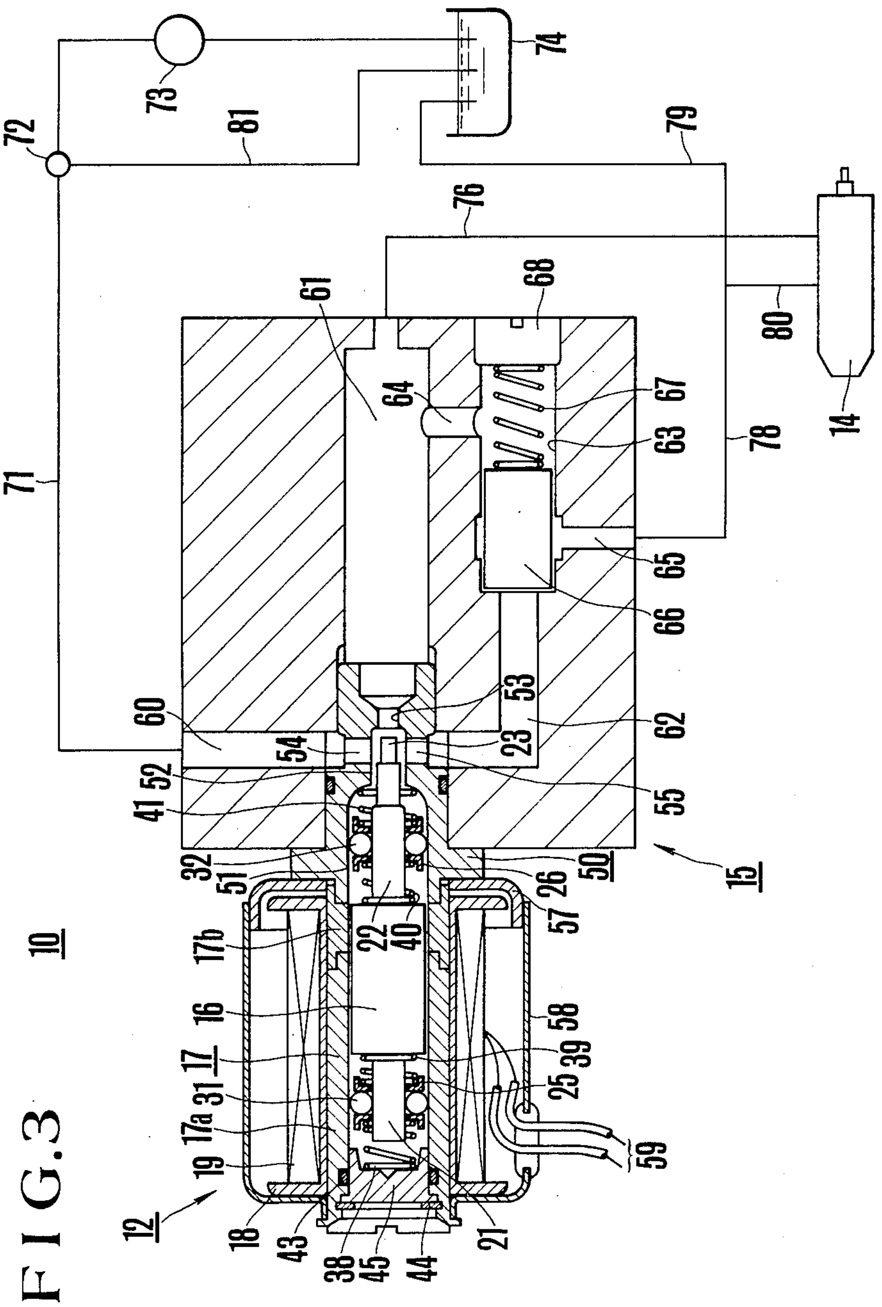
FIG. 3 is a longitudinal sectional view showing one embodiment of this invention in which the novel electro-mechanical converter of this invention is used to control the flow of the operating fluid supplied to a power steering unit.

FIG. 3 shows one embodiment of the electro-mechanical converter according to this invention and applied to control the flow of the operating fluid supplied to a power steering unit. The flow control device 10 shown in FIG. 3 comprises a servovalve 12 including an electro-mechanical converter utilizing a solenoid coil 19 and a flow controller 15 which controls the flow of the operating fluid supplied to a power steering unit 14.

Figure 4:
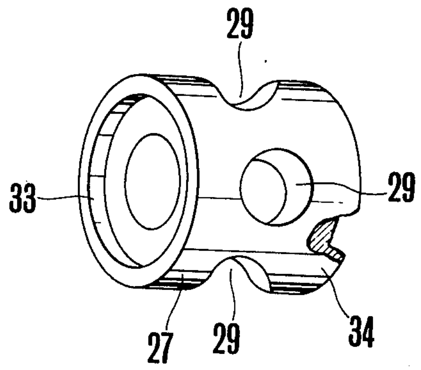
FIG. 4 is a perspective view of the cylindrical bearing member 27".

The servovalve 12 comprises a cylindrical plunger 16, a cylinder 17 containing the same, a coil bobbin 18 surrounding the cylinder and a solenoid coil 19 wound about the bobbin. The plunger 16 has an outer diameter slightly smaller than the inner diameter of the cylinder 17 and provided with axial guide rods 21 and 22 at the opposite ends. A needle valve member 23 which constitutes a needle valve together with an orifice to be described later extends axially from the outer end of the guide rod 22. The guide rods 21 and 22 are journalled by bearings 25 and 26. Each bearing comprises a cylindrical bearing member 27 as shown in FIG. 4 and having an inner diameter larger than the outer diameter of the guide rods. The cylindrical bearing member 27 is provided with a plurality of equally spaced apart radial perforations 29 to rotatably receive steel balls 31 and 32 interposed between the guide rods and the cylinder 17. As shown in FIG. 4, the bearings 25 and 26 are provided with flanges 33 and 34 at their end for receiving one end of springs 38, 39, 40 and 41. The spring 39 is disposed between bearing 25 and plunger 16, while spring 40 is disposed between plunger 16 and bearing 26. The other end of spring 38 is supported by a spring seat 45 which is fitted into the cylinder 17 through an O-ring 43 and secured to one end of the cylinder 17 by a clamping ring 44. The cylinder 17 is constituted by a cylindrical member 17*a* made of magnetic material, a non-magnetic cylindrical member 17*b* and a cylindrical member 51 of the base 50 of the servovalve. One end of spring 41 engages the bearing 26 and the other end is received in the bottom of the cylindrical member 51. A needle valve member 23 operated by the plunger 16 extends in the axial direction through an opening at the bottom of the cylindrical member 51. The needle valve member 23 co-coperates with an orifice 53 which forms the needle valve together with the valve member 23. The base 50 is provided with perforations 54 and 55 extending at right angles with respect to the opening 52. Reference numeral 57 designates a yoke, 58 a cover, and 59 input terminals of the solenoid coil 19.

The flow controller 15 incorporated with the servovalve 12 is provided with an inlet port 60 communicated with the opening 54, a chamber 61 communicated with orifice 53, a chamber 63 communicated with opening 55 through a passage 62, a flow passage interconnecting these chambers 61 and 62 and a discharge port 65 communicated with the chamber 63. The chamber 63 contains a plunger 66 slidable therein and a spring 67 which normally urges the plunger 66 in one direction to close the discharge port 65. The outer end of the chamber 63 is closed by a plug 68.

The inlet port 60 of the flow controller 15 is connected to an oil reservoir 74 through a conduit 71, a relief valve 72 and a pump 73 while the chamber 61 is connected to the power steering unit 14 through a conduit 76. The discharge port 65 is connected to the reservoir 74 via conduits 78 and 79. The power steering unit 14 is also connected to the reservoir 74 via conduits 80 and 79 whereas the relief valve 72 is connected to the reservoir 74 via conduit 81.

When a motor car equipped with the apparatus described above is stopped and when no current is supplied to the solenoid coil 19 of the servovalve 12, the plunger 16 will be maintained in a position shown in FIG. 3.

When the motor starts to run, a current corresponding to the speed of the motor car is supplied to the solenoid coil 19 to move the plunger 16 to the right as viewed in FIG. 3, that is toward the needle valve.

Figure 2:
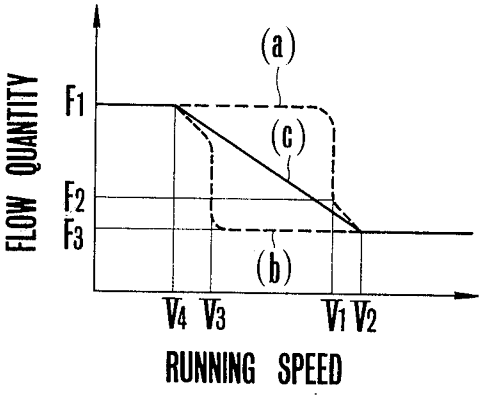
FIG. 2 shows the flow quantity-running speed characteristics of the power-steering unit utilizing the prior art flow control device and that embodying the invention.

During the low speed running, the needle valve 23 is separated sufficiently from the orifice 53 so that the oil admitted into the inlet port 60 of the flow controller 15 from the oil reservoir 74 through pump 73 and relief valve 72 will not be controlled by the needle valve. Consequently, a quantity $F_1$ shown by FIG. 2 is supplied to the power steering unit through chamber 61 thus fully operating the power steering unit. Thus, under the low speed running condition, steering can be made with a small power. This advantage can also be provided while the car is stopping.

When the motor car runs at a high speed the current supplied to the solenoid coil increases whereby the plunger 16 is moved further to the right to advance the needle valve member 23 into the orifice 53 thus decreasing the oil quantity passing through the needle valve to $F_3$ from $F_1$ shown in FIG. 2. Accordingly, the steering power of the power steering unit 14 is increased thus requiring larger power for operating a steering handle at the time of high speed running. When the pressure in the inlet port 60 becomes higher than the pressure in the chamber 63, the plunger 66 is moved to the right against the force of the spring 67 to return the oil in the inlet port 60 to the oil reservoir 74 via openings 54, 55, conduit 62, chamber 63, discharge port 65 and conduits 78 and 79. When the pressure differential between the inlet and the discharge ports exceeds a predetermined value, the relief valve 72 returns the oil to the reservoir 74.

Figure 1:
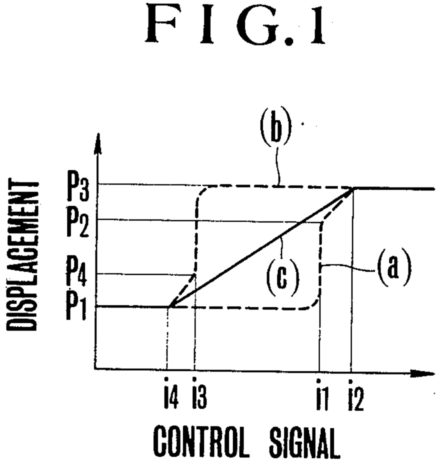
FIG. 1 shows the displacement-control signal characteristics of a prior art electro-mechanical converter utilizing a solenoid coil; and that embodying of this invention.

The electro-mechanical converter of the servovalve 12 which characterizes the invention operates as follows. When the plunger 16 is moved to the right by the attractive force of the solenoid coil 19, since the plunger 16 is supported with respect to the cylinder 17 by only ball bearings, the frictional resistance between the plunger and the cylinder is much smaller than slide resistance. Accordingly, it is possible to move the plunger in proportion to the magnitude of the control current supplied to the solenoid coil 19. This is also true when the plunger is moved in the opposite direction. Thus, where the electro-mechanical converter of this invention is used, it is possible to gradually move the plunger in proportion to the current between points $P_1$ and $P_3$ as shown by curve c shown in FIG. 1, thus eliminating the prior art hysteresis characteristic. Consequently, it is possible to linearly move the plunger over a wide range of the control current. As a consequence, the variation of the flow quantity from $F_1$ to $F_3$ when car speed changes from low to high speed is equal to that from $F_3$ to $F_1$ when the car speed changes as shown by curve c shown in FIG. 2. The curves c shown in FIG. 1 and FIG. 2 are identical showing elimination of the hysteresis characteristic. Consequently, the switching of the flow quantity of the oil supplied to the power steering unit 14 which is affected between low and high speed runnings can be made very smoothly whereby the steering feeling of the driver would not be adversely affected.

Since a needle valve is used as the control valve it is possible to gradually vary the flow quantity of the oil supplied to the power steering unit in proportion to the variation in the running speed, thus facilitating the steering.

Since the bearings 25 and 26 are clamped between springs 38, 39, 40 and 41 and slidable with respect to guide rods 21 and 22, the amount of movements of the steel balls 31 and 32 is one half of that of the plunger thus decreasing the rolling frictional resistance.

It will be clear that the invention is not limited to the embodiment described above. For example, another type of control valve may be used instead of a needle valve. The ball bearing may be made of materials other than steel. Furthermore instead of forming the flanges 33 and 34 which receive one end of the springs at the ends of the bearings 25 and 26 they may be formed on the inner periphery of the cylinder. One of the ball bearings 25 and 26 for supporting the plunger may be replaced by another type of bearing. For example, bearing 25 may be replaced by a conventional bearing which supports the guide rod on the spring seat. A mere guide opening can also be used. The bearing 25 may be substituted by a linear motion ball bearing sold by Nippon Thompson Co.

Figure 5:
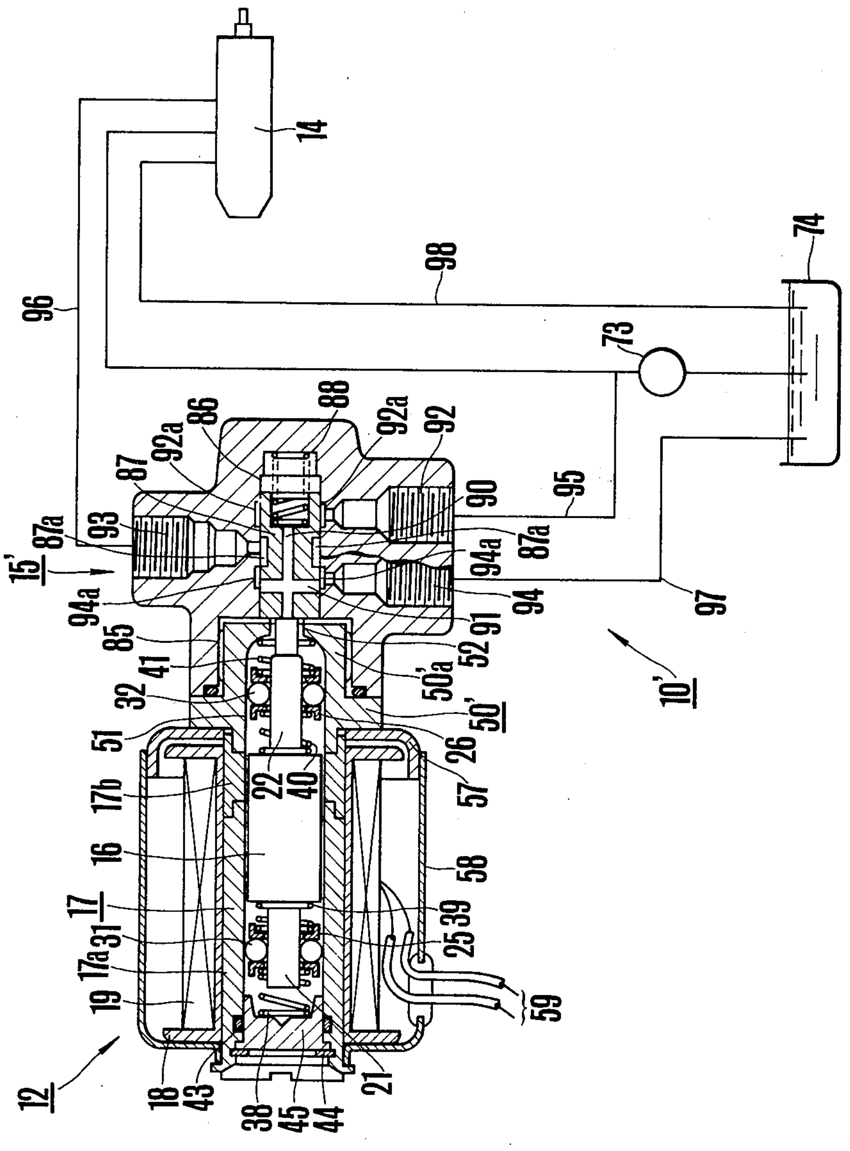
FIG. 5 is a longitudinal section showing a modification of this invention in which the electro-mechanical converter is applied to a pressure control type power steering unit.

FIG. 5 shows a modified embodiment of this invention suitable for use for a pressure control type power steering unit. The servovalve 12 utilized in this modification is identical to that shown in FIG. 1 so that the parts thereof are designated by the same reference characters. The base 50' of the servovalve constitutes a pressure control device together with an oil pressure controller 15' which controls the oil pressure supplied to the power steering unit 14. The cylindrical member **50'*a* of the base 50' of the servovalve is threaded into a recess 85 of the oil controller 15' through an O-ring. At the bottom of the recess 85 of the oil pressure controller there is formed a blind opening 86 coaxially with the guide rod of the servovalve 12 for slidably accommodating a spool valve 87. The lefthand end of the spool valve confronts the righthand end of the guide rod 22 while the other end of the spool valve 87 is supported by a spring 88** for normally biasing the spool valve towards the guide rod.

The spool valve 87 is formed with a longitudinal through opening 90 and an opening 91 perpendicular thereto. The oil pressure controller 15' is provided with an inlet port 92 extending from its outer wall to the blind opening 86 and first and second discharge openings 93 and 94. The inlet port 92 is communicated with the reservoir 74 through conduit 95 and oil pump 73. The first discharge port 93 is communicated with the power steering unit 14, particularly the reaction chamber thereof, through conduit 96, while the second discharge port 94 is directly connected to the reservoir 74 via conduit 97. The oil in the power steering system 14 is returned to the reservoir through conduit 98. An annular groove **92*a* communicated with the inlet port 92 is formed on the inner surface of the blind opening 86. In the same manner, an annular groove 94*a* is provided to communicate with the second discharge port 94. An annular groove 87*a* is formed at the center of the outer surface of the spool valve 87. As will be described later the groove 87*a* cooperates with the first discharge port 93 and grooves 94*a* and 92*a*** to provide a valve action.

Under low speed running, although the displacement of the plunger 16 is small, the groove **94*a* is communicated with the groove 87*a* of the spool valve 87 to connect the power steering unit 14 to the reservoir 74 so as to decrease the reaction which is created when the steering wheel is rotated. Under these conditions, the groove 87*a* is isolated from the groove 92*a***.

At the time of the high speed running the displacement of the plunger 16 becomes large so that the spool valve 87 is moved to the right by the plunger. As a consequence, the groove **87*a* of the spool 87 is transferred from groove 94 to groove 92*a*. Then the oil supplied to the inlet port 92 by oil pump 73 flows to the first discharge port 93 via grooves 92*a* and 87*a* and then to the power steering unit 14 via conduit 96**, thereby increasing the pressure in the reaction chamber of the power steering unit as well as the reaction to the steering.

At an intermediate point between high and low speeds, while the groove **87*a* of the spool 87 is being transferred from groove 94*a* to groove 92*a*, these three grooves are communicated with each other, the degree of inter-communication being determined by the relative position of these grooves. In the same manner as the first embodiment, the plunger 16 moves linearly as shown by curve c in FIG. 1**, with the result that the oil pressure in the power steering unit also varies linearly.

Figure 6:
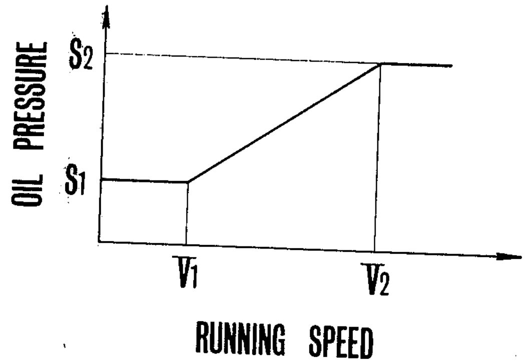
FIG. 6 shows the pressure-running speed characteristic of the power steering unit shown in FIG. 5.

The operating characteristic is shown in FIG. 6 in which the abscissa represents the running speed of a motor car and the ordinate the oil pressure supplied to the power steering unit. As can be noted from this characteristic, when the speed of the car changes from low ($V_1$) to high ($V_2$), or vice versa, the oil pressure varies from $S_1$ to $S_2$, or vice versa, that is linearly in proportion to the amount of movement of the plunger of the electro-mechanical converter. Accordingly, there is no fear of adversely affecting the steering feeling of the driver which has been inevitable in the prior art when changing the running speed.

Further, in the embodiment shown in FIG. 3, the connection from the power steering unit 14 and the pump 73 to the flow controller 15 may be changed to provide the stable operation of the needle valve. Namely, the conduit 71 from the pump 73 is changed to connect to the chamber 61 while the conduit 76 extending to the power steering unit 14 is changed to connect to the inlet port 60. With the connecting relation before the change as mentioned above, when the needle valve member 23 is moved in the direction toward the right side of the figure with the attracting force by the coil acting on the plunger 16, the force acting on the valve member 23 which is created with the pressure difference between inlet port 60 and the chamber 61 comes to be added to the said attracting force to act on the needle valve, thus insufficient stability in the control operation being obtained. Contrary to this, according to the modified embodiment in which the conduit connection is changed as aforementioned, the said attracting force and the said force caused by the pressure difference come to act on the needle valve in the opposite direction, so that the control operation of the needle valve becomes more stable. In this case, it is apparent that the spring means 67 has to be provided on the opposite side of the plunger 66.

What is claimed is:

1. In control apparatus for a power steering unit of a motor car of the type wherein a plunger contained in a cylinder having an inner diameter is moved in the axial direction thereof in accordance with the magnitude of a speed signal of the motor car, said speed signal being passed through a solenoid coil wound about said cylinder, and the amount or pressure of operating fluid supplied to said power steering unit is controlled by a control valve operated by said plunger, the improvement wherein the outer diameter of said plunger is less than said inner diameter such that said plunger can move freely within said cylinder without causing undue sliding friction therebetween, said plunger including a pair of substantially coaxial guide rod portions having an outer diameter less than said outer diameter of said plunger located at opposite ends thereof to minimize transaxial rotation of said plunger, and further including a pair of bearing members each associated to a different one of said pair of guide rod portions, each said bearing member comprising a plurality of rotatable bearing elements arranged for rolling movement between the associated one of said guide roll portions and said inner diameter of said cylinder, keeper means having an aperture arranged about said associated guide rod portion for translational movement therealong and having a plurality of bearing element apertures for receiving said bearing elements, and spring bias means for applying a first biasing force between the adjacent end of said plunger and said keeper means and a second biasing force between said keeper means and the adjacent end of said cylinder for reducing linear motion of said bearing elements along the axis of said cylinder in response to plunger movement therealong by a predetermined amount, said plunger being supported in said cylinder by said rotatable bearing elements.

2. In an electro-mechanical converter of the type wherein a plunger contained in a cylinder having an inner diameter and a longitudinal axis is moved in the axial direction thereof by passing a control signal through a solenoid coil wound about the cylinder, the improvement wherein the outer diameter of said plunger is less than said inner diameter such that said plunger can move freely within said cylinder without causing undue sliding friction therebetween, said plunger including a pair of substantially coaxial guide rod portions having an outer diameter less than said outer diameter of said plunger located at opposite ends thereof to minimize transaxial rotation of said plunger, and further including a pair of bearing members each associated to a different one of said pair of guide rod portions, each said bearing member comprising a plurality of rotatable bearing elements arranged for rolling movement between the associated one of said guide rod portions and said inner diameter of said cylinder, keeper means having an aperture arranged about said associated guide rod portion for translational movement therealong and having a plurality of bearing element apertures for receiving said bearing elements, and spring bias means for applying a first biasing force between the adjacent end of said plunger and said keeper means and a second biasing force between said keeper means and the adjacent end of said cylinder for reducing linear motion of said bearing elements along the axis of said cylinder in response to plunger movement therealong by a predetermined amount, said plunger being supported in said cylinder by said rotatable bearing elements.

3. The apparatus according to claim 2 or 1 wherein said rotatable bearing elements comprise individual ball bearings.

4. The apparatus according to claim 2 or 1 wherein said spring bias means comprises a first spring coupled between said adjacent plunger end and a first end of said keeper means and a second spring coupled between a second end of said keeper means and said adjacent cylinder end.

5. The apparatus according to claim 2 or 1 wherein said predetermined amount is approximately ½ the linear translation of said plunger.

* * * * *